United States Patent [19]

Colamonico

[11] 4,325,030
[45] Apr. 13, 1982

[54] FREQUENCY DISCRIMINATOR FOR SIGNAL RECEIVER OF TELECOMMUNICATION SYSTEM

[75] Inventor: Armando Colamonico, Milan, Italy

[73] Assignee: Società Italiana Telecomunicazioni Siemens S.p.A., Milan, Italy

[21] Appl. No.: 131,704

[22] Filed: Mar. 19, 1980

[30] Foreign Application Priority Data

Mar. 20, 1979 [IT] Italy ............................... 21129 A/79

[51] Int. Cl.³ ........................ H03K 5/00; H03B 1/00; H03L 7/00
[52] U.S. Cl. .................................... 328/140; 328/167
[58] Field of Search ............... 328/167, 166, 140, 141; 307/525, 526

[56] References Cited

U.S. PATENT DOCUMENTS

| 3,731,188 | 5/1973 | Smith | 328/167 |
| 3,812,432 | 5/1974 | Hanson | 328/140 |
| 3,942,126 | 3/1976 | Muraoka | 328/167 |

Primary Examiner—David K. Moore
Attorney, Agent, or Firm—Karl F. Ross

[57] ABSTRACT

A frequency discriminator designed to respond to a selected incoming tone frequency comprises a pulse generator connected via an adjustable frequency divider to a binary 8-stage counter which generates eight relatively staggered pulse trains whose cadence varies with the setting of the divider. This setting can be varied, e.g. in a programmed manner according to a pattern of tone frequencies to be recognized, while incoming signals are applied to an eight-path filter driven by the staggered pulse trains. When the cadence of the pulse trains matches an incoming tone frequency, the filter emits an output exceeding a predetermined threshold.

5 Claims, 3 Drawing Figures

FREQUENCY DISCRIMINATOR FOR SIGNAL RECEIVER OF TELECOMMUNICATION SYSTEM

FIELD OF THE INVENTION

My present invention relates to a frequency discriminator to be used in signal-receiving equipment of a telecommunication system.

BACKGROUND OF THE INVENTION

In some telecommunication systems it is customary to provide transceivers with frequency discriminators designed to recognize a certain tone or tone sequence used for ancillary operations such as switching and supervision. Generally, in such instances, a considerable number of tone frequencies (e.g. several tens) are utilized for various ancillary functions. It thus becomes necessary to employ a corresponding number of fixed narrow-band filters to recognize the respective tone frequencies or to use a single adjustable filter for this purpose.

The retuning of filters by the adjustment of an impedance in an L/C or R/C network requires high-precision components properly calibrated to pass the desired tone frequency with a given setting. Frequency discriminators of this type, though less complex than those including a multiplicity of fixed-band filters, are therefore relatively expensive.

OBJECT OF THE INVENTION

The object of my present invention, accordingly, is to provide an improved frequency discriminator of simple circuitry which requires no calibration and is readily programmable to recognize a multiplicity of different frequencies distributed over a wide range.

SUMMARY OF THE INVENTION

In accordance with my present invention, I provide a preferably crystal-controlled oscillator producing an original pulse sequence of stable clock frequency working into an adjustable frequency divider which generates a square wave of a reduced frequency related to the clock frequency by a variable step-down factor n. A pulse distributor connected to the frequency divider, such as an N-stage pulse counter with decoded stage outputs, converts that square wave into a set of N relatively staggered pulse trains whose cadence or recurrence frequency is 1/N times the aforementioned reduced frequency. The several pulse trains are fed to respective driving inputs of an N-path filter having a data input to which the signal frequencies to be recognized are supplied from an associated receiver. Whenever an incoming signal frequency substantially matched the cadence of the driving pulse trains, the filter energizes a detector in its output which may include a rectifier stage followed by a threshold circuit. The frequency divider has a control input connected to a manually operable or preprogrammed frequency selector for modifying its step-down factor n according to a desired signal frequency to be recognized.

BRIEF DESCRIPTION OF THE DRAWING

The above and other features of my present invention will now be described in detail with reference to the accompanying drawing in which.

SPECIFIC DESCRIPTION

Figure 1:
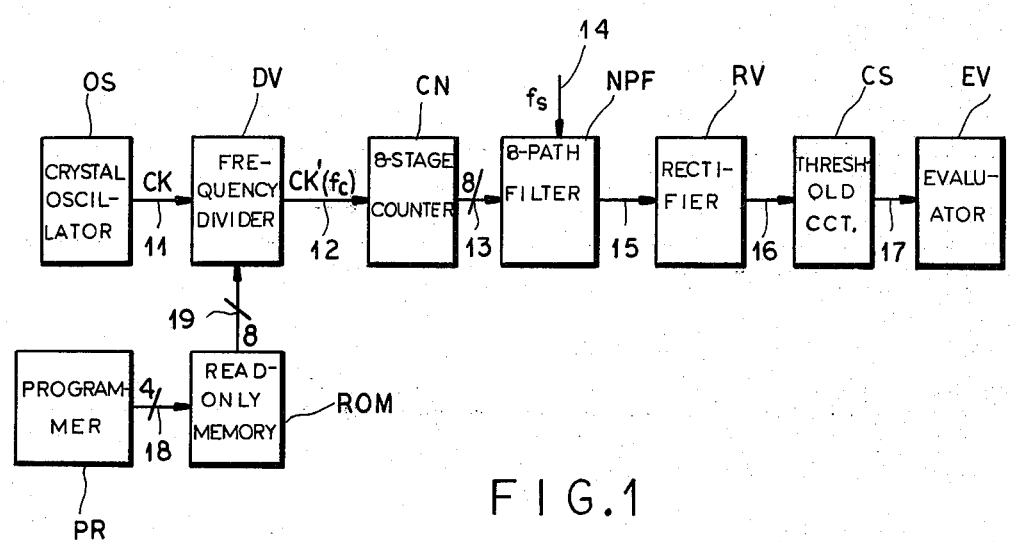
FIG. 1 is a block diagram of a frequency discriminator according to my invention.
Figure 3:
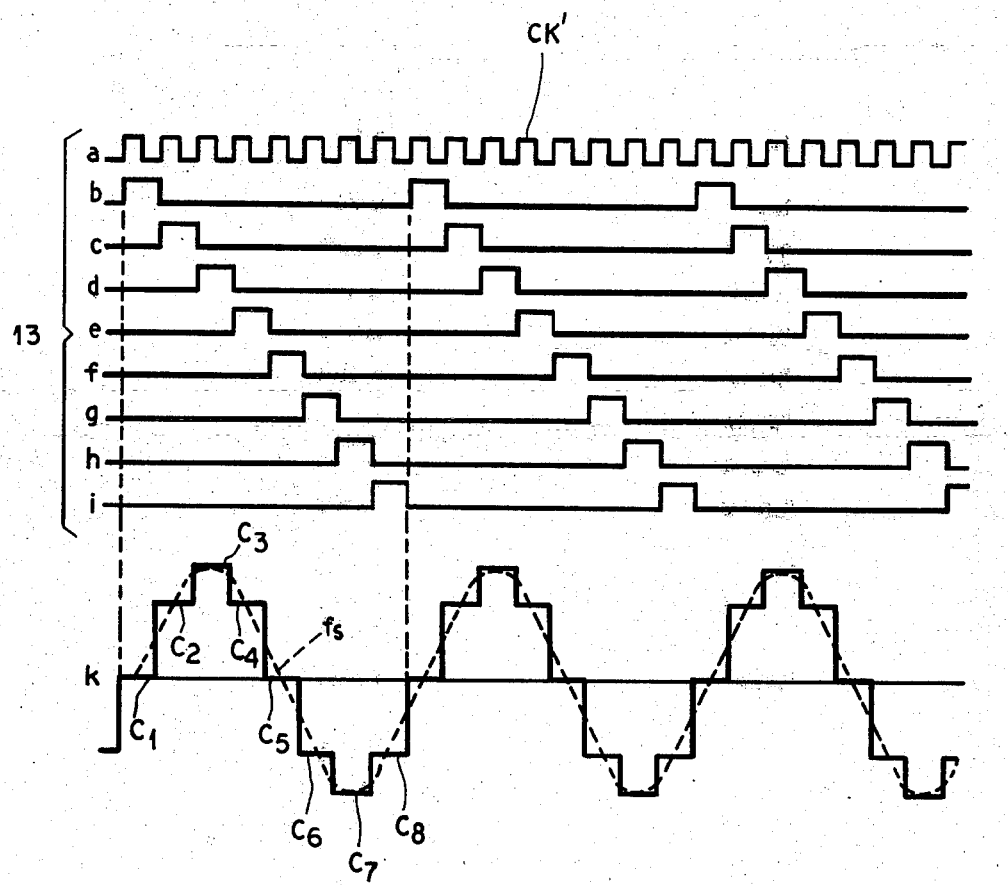
FIG. 3 is a set of graphs showing waveforms appearing at various points of the discriminator.

In FIG. 1 I have shown a frequency discriminator comprising a crystal-controlled oscillator OS which emits a sequence of clock pulses CK of high frequency stability over a lead 11 to an adjustable frequency divider DV. A square wave CK' of reduced frequency $f_c$, shown in graph (a) of FIG. 3, is delivered by divider DV over a lead 12 to a pulse distributor in the form of an 8-stage binary counter CN whose stage outputs, upon decoding by a nonillustrated logic network as is well known per se, emit eight trains of relatively staggered but nonoverlapping pulses illustrated in graphs (b) through (i) of FIG. 3. The cadence of each of these pulse trains, as will be apparent from FIG. 3, is one-eighth that of square wave CK', i.e. frequency $f_c$, which in turn is 1/n times the clock frequency generated by oscillator OS.

Figure 2:
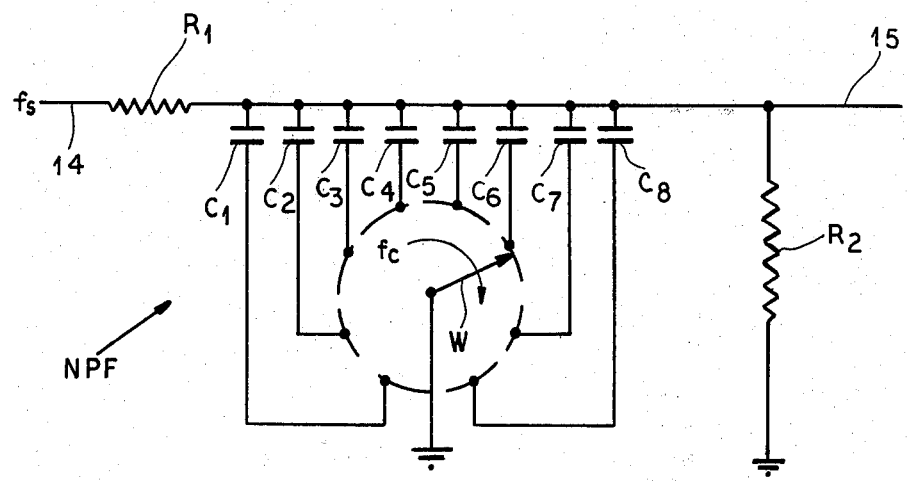
FIG. 2 is a more detailed diagram of an 8-path filter included in the discriminator of FIG. 1.

The eight pulse trains issuing from counter CN are transmitted via respective leads of an 8-lead multiple 13 to an N-path filter NPF, also known per se, with N=8. Filter NPF has a data input 14 on which it receives incoming signal frequencies including a tone frequency $f_s$ to be recognized. The operation of the filter has been schematically represented in FIG. 2 which shows input lead 14 connected by way of a resistor $R_1$ to a set of eight capacitors $C_1$–$C_8$, each of these capacitors being further connected to a respective bank contact successively engaged by a grounded wiper W which is rotated at one revolution per cycle of driving frequency $f_c$. In the actual filter, wiper W is replaced by eight electronic switches respectively controlled by the pulse trains from counter CN for briefly closing these switches in cyclic succession. An output voltage is developed across another resistor $R_2$ connected between ground and an extension 15 of lead 14.

When an incoming tone frequency $f_s$ matches the driving frequency $f_c$, which in turn is determined by the step-down ratio 1:n of divider DV, each capacitor of filter NPF sees substantially the same input voltage every time it is connected in circuit by wiper W whereby more or less constant charges of different magnitudes and signs are built up on the several capacitors. This has been illustrated in graph (k) of FIG. 3 where the capacitor voltages have been superimposed upon a signal wave $f_s$ shown in dotted lines. The signal wave $f_c$ appearing on output resistor $R_2$ is fed via lead 15 to a rectifier stage RV which detects its mean amplitude and energizes a threshold circuit CS by way of a lead 16. Circuit CS, in response to a signal amplitude surpassing its threshold, triggers an evaluator EV—possibly including a visual indicator—via a lead 17. When frequencies $f_c$ and $f_s$ significantly differ from each other, except with certain harmonic relationships, the capacitor charges do not conform to a sinusoidal pattern.

The step-down ratio 1:n of frequency divider DV can be modified by 8-bit code words delivered over an 8-lead multiple 19 to a control input thereof. These code words, serving to modify the connections of certain divider stages, are obtained from a read-only memory ROM where they are stored in 16 cells selectively addressable by a programmer PR via a 4-lead multiple 18. Programmer PR may, for example, emit a predetermined series of addresses corresponding to a sequence of tone signals expected to be received from a remote station.

The selectivity of filter NPF depends essentially on the time constants of the several R/C networks constituted by input resistor $R_1$ and charging capacitors $C_1$–$C_8$. These time constants, in general, should not be so large as to introduce significant delays in signal recognition, especially with radiotelephone systems. The frequency of clock pulses CK may vary within certain tolerance limits wherefore the oscillator OS need not operate with a very high degree of precision.

I claim:

1. A frequency discriminator for a signal receiver of a telecommunication system, comprising:
    oscillator means for producing an original pulse sequence of stable clock frequency;
    adjustable frequency-divider means connected to said oscillator means for generating a square wave of a reduced frequency related to said clock frequency by a variable step-down factor;
    pulse-distributing means connected to said frequency-divider means for converting said square wave into a set of N relatively staggered pulse trains of a cadence equal to 1/N times said reduced frequency;
    an N-path filter with driving inputs connected to said pulse-distributing means for energization by said pulse trains and with a data input connected to receive incoming signals;
    detection means connected to said N-path filter for determining the reception of an incoming signal whose frequency substantially matches said cadence; and
    frequency-selecting means connected to a control input of said frequency-divider means for modifying said step-down factor according to a desired signal frequency to be recognized.

2. A frequency discriminator as defined in claim 1 wherein said pulse-distributing means comprises an N-stage pulse counter with decoded stage outputs.

3. A frequency discriminator as defined in claim 2 wherein N=8.

4. A frequency discriminator as defined in claim 1, 2 or 3 wherein said frequency-selecting means comprise a read-only memory storing a multiplicity of step-down codes and reading out a chosen step-down code upon being addressed by a programmer.

5. A frequency discriminator as defined in claim 1, 2 or 3 wherein said detection means comprises a rectifier followed by a threshold circuit.

* * * * *